(No Model.)
C. W. COTTON.
ART OF SETTING TIRES.
No. 453,756. Patented June 9, 1891.
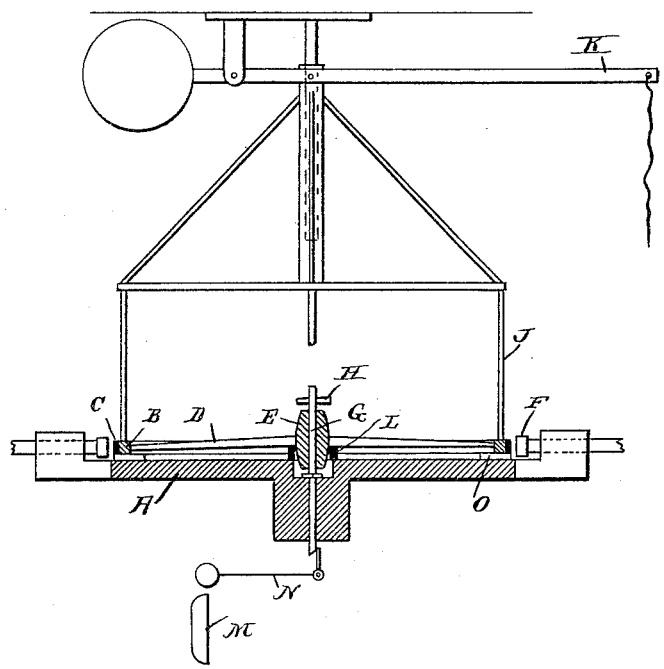
Witnesses:
P. P. Sheehan
M. S. Belden
Charles Ward Cotton
Inventor
by James W. See
Attorney

UNITED STATES PATENT OFFICE.

CHARLES WARD COTTON, OF INDIANAPOLIS, INDIANA.

ART OF SETTING TIRES.

SPECIFICATION forming part of Letters Patent No. 453,756, dated June 9, 1891.

Application filed January 30, 1891. Serial No. 379,620. (No model.)

*To all whom it may concern:*

Be it known that I, CHARLES WARD COTTON, of Indianapolis, Marion county, Indiana, have invented certain new and useful Improvements in the Art of Setting Tires, of which the following is a specification.

In setting tires upon vehicle-wheels it is quite common to make the tire larger than the wheel and then compress it upon the wheel by the action of inwardly-moving compressors. Generally the wheel is laid upon a plate or table and supported at its rim during the operation of compressing the tire, and as the compression takes place the center of the wheel rises till the proper dishing of the wheel is produced; but the wheel, before the tire is applied, may be warped or sprung or slightly dished the wrong way, and in the latter case while the wheel is in the tire-setting machine the unsupported center of the wheel forms by its gravity, a serious resistance to the proper dishing and the compression of the tire is therefore apt to produce an undesired crushing effect upon the wheel.

My invention pertains to improvements in this art, and my improvements will be readily understood from the following description, taken in connection with the accompanying drawing, which is a vertical section of a tire-setting machine, the description of the operation of which will enable my improved method of setting tires to be better understood.

In the drawing, A indicates the usual table of a tire-setting machine; B, the rim of the wheel on which the tire is to be set; C, the tire; D, the spokes of the wheel; E, the hub of the wheel; F, the compressors, to act inwardly, by any usual means, and compress the tire upon the rim; G, the central stud projecting up from the center of the table and through the eye in the hub of the wheel, this stud in the case chosen to illustrate the present invention being capable of upward motion in the table; H, the usual removable key through the stud over the hub at that distance above the hub representing the position of the top of the hub when the wheel is properly dished, due allowance being made, of course, for the elastic recovery of the wheel when the compression is removed; J, a pressing device bearing upon the top of the rim of the wheel, the pressing device chosen for illustration consisting simply of a rising and falling frame having legs bearing with their feet upon the rim of the wheel, these legs being distributed properly around the wheel; K, a lever for operating the pressing device and producing downward pressure upon the rim of the wheel; L, a ring upon the table, of a size to freely admit the hub and of a height to engage the lower edges of the spokes at the hub, this ring forming a central support for the wheel, so that when the wheel is first laid upon the table it will be supported solely by this central support; M, an alarm-bell; N, the bell-striking lever triggered to the stud G, so that when the stud rises the bell is struck, and O gages upon the table under the rim to limit the descent of the rim, which gages may, however, be dispensed with and the rim allowed to descend to the table.

The ring L is of such height that when the wheel is laid upon the table it is supported thereby with the rim above and free from the table or the gages O, if the gages are employed. A support directly under the hub would answer the purpose of the ring L; but the ring under the spokes is preferable, by reason of the fact that downward strains upon the rim will then bring less hurtful strains upon the tenons and mortises upon the hub. When the wheel is thus laid upon the table and supported at its center, it is obvious that the rim tends to drop and produce an initial dishing, and whether it drops or not it is a certainty that the center of the wheel cannot by its gravity oppose the dishing of the wheel so as to call for crushing strains before the dishing takes place; but after the wheel is in place on the table and supported at its center only I produce a downward pressure upon the rim by means of the pressing device J, and this pressure may, if desired, depress the rim as far as permitted by the table or by the gages, if the gages are present. An initial dishing is therefore insured and in the right direction, even if the wheel happens to be sprung or warped into a reversed dish, and if the wheel-rim be warped then the downward pressure on the rim flattens the rim out upon the gages or table. While the wheel is thus held with an upward strain upon its center the tire is compressed in the usual manner, and as the compression proceeds the center of the wheel rises from its support and the dishing continues. The hub will in the course of the procedure reach the key H, which is usually an unyielding stop, which limits the dishing and results in crushing strains if the compression be continued; but by my system the key or stop is a mere indication of limit and is lifted by the hub as the hub rises, and the lifting of this indicator gives the alarm, and the compression may be stopped. If the compression be not stopped when the alarm is given, the effect will be simply to overdish the wheel, but not to crush it, the center of the wheel coming up against no unyielding stop.

I claim as my invention—

1. That improvement in the art of setting tires on wheels which consists in disposing the wheel horizontally and supporting it entirely at the hub and initiating the compression of the tire upon the wheel while the wheel is thus supported.

2. That improvement in the art of setting tires on wheels which consists in disposing the wheel horizontally and supporting it entirely at the hub, pressing downward upon the rim, and initiating the compression of the tire upon the wheel while thus supported and pressed.

3. That improvement in the art of setting tires on wheels which consists in disposing the wheel horizontally and supporting it entirely at the hub, disposing a yielding stop over the hub, initiating the compression of the tire while the wheel is thus supported entirely at the center, causing the support of the wheel to change from the center to the rim as the tire is compressed, and continuing the compression till the hub rises to the limit indicated by the yielding stop.

4. That improvement in the art of setting tires on wheels which consists in initiating the compressive strains upon the tire while the wheel is being pressed into dish shape by pressure in one direction at the rim and in an opposite direction at the hub.

CHARLES WARD COTTON.

Witnesses:
WILLIAM JACKSON,
JASPER A. CARROLL.